March 8, 1966  R. J. ARTHUR ETAL  3,238,788
ACCELEROMETER
Filed May 19, 1959  4 Sheets-Sheet 1

INVENTORS:
RICHARD J. ARTHUR,
HELMUT W. E. SCHLITT
and RICHARD M. ZEHR
BY: Beau, Brooks, Buckley & Beau,
ATTORNEYS.

March 8, 1966  R. J. ARTHUR ETAL  3,238,788
ACCELEROMETER
Filed May 19, 1959  4 Sheets-Sheet 3
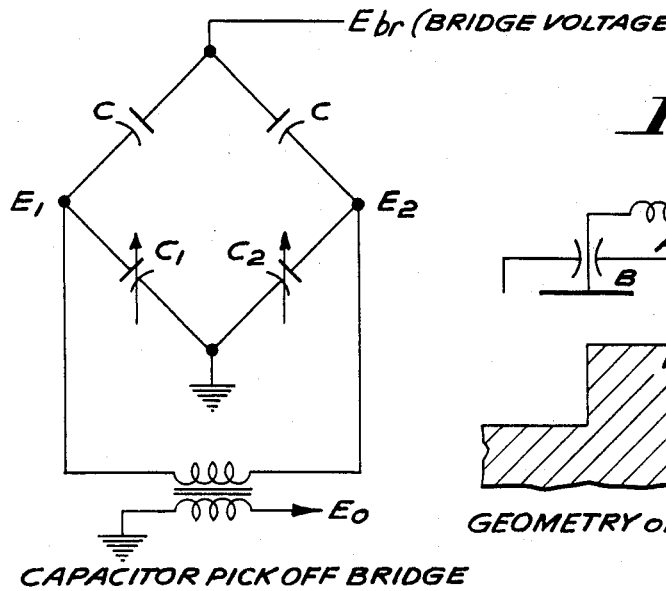
FIG. 5 — CAPACITOR PICK OFF BRIDGE
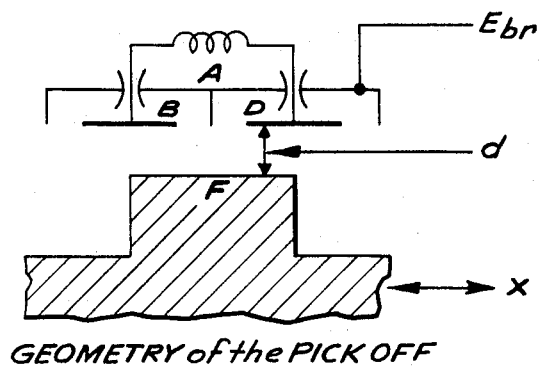
FIG. 6 — GEOMETRY of the PICK OFF
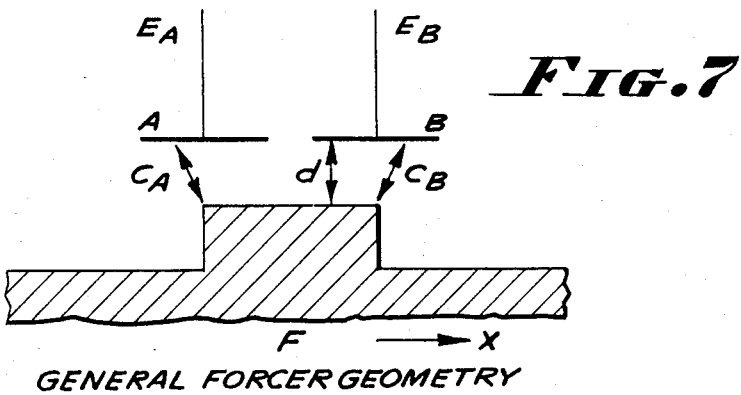
FIG. 7 — GENERAL FORCER GEOMETRY
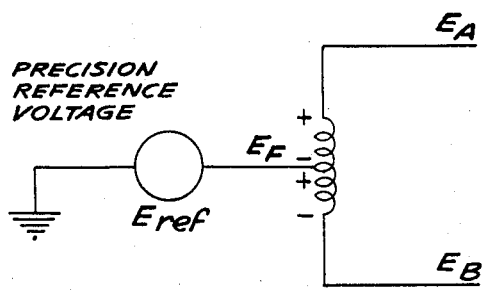
FIG. 8 — LINEARIZATION FORCER CIRCUITRY
INVENTORS:
RICHARD J. ARTHUR,
HELMUT W. E. SCHLITT
and RICHARD M. ZEHR
BY: Beau, Brooks, Buckley & Beau,
ATTORNEYS.

HIGH RANGE ELECTROSTATIC ACCELEROMETER with ELECTRONICS

LEGEND:
Ea = A.C. SUSPENSION VOLTAGE (200 K.C.).
E REF.1, E REF.2 = D.C. FORCER BIAS VOLTAGES.
Ep1, Ep2 = PULSE VOLTAGES FOR POSITIVE AND NEGATIVE ACCELERATIONS.
Ec1, Ec2 = COMPENSATION VOLTAGES, DERIVED FROM Eo.
Eo = PICK-OFF VOLTAGE.

United States Patent Office 3,238,788
Patented Mar. 8, 1966

3,238,788
ACCELEROMETER
Richard J. Arthur, Kenmore, Helmut W. E. Schlitt, Williamsville, and Richard M. Zehr, Tonawanda, N.Y., assignors, by mesne assignments, to Bell Aerospace Corporation, Wheatfield, N.Y., a corporation of Delaware
Filed May 19, 1959, Ser. No. 814,235
10 Claims. (Cl. 73—517)

This invention relates to accelerometers, and has for a primary object the design of an accelerometer of greatly improved precision characteristics and wherein the scale and suspension forces may be easily adjusted to permit use of the instrument over a wide dynamic range.

Another object of the invention is to provide an accelerometer having an improved proof mass suspension system, thereby eliminating previously encountered suspension forces and torques necessarily inherent in previously used bearing systems, flex leads, and the like.

Another object is to provide an improved accelerometer system as aforesaid which includes provision for calibration and use of the mechanism over a wide range by simply changing voltages applied to the suspension and forcer mechanisms of the system.

Another object of the invention is to provide in a mechanism as foresaid an improved forcer system which is independent of displacements of the proof mass.

Other objects and advantages of the invention will appear from the specification hereinafter, wherein:

FIG. 5 is a schematic representation of the circuitry of the pick off system;

FIG. 6 is a schematic of the structure of the pick off component;

FIG. 7 is a schematic of the geometry of the forcer component;

FIG. 8 is a schematic of a detail of the forcer system;

Figure 1:
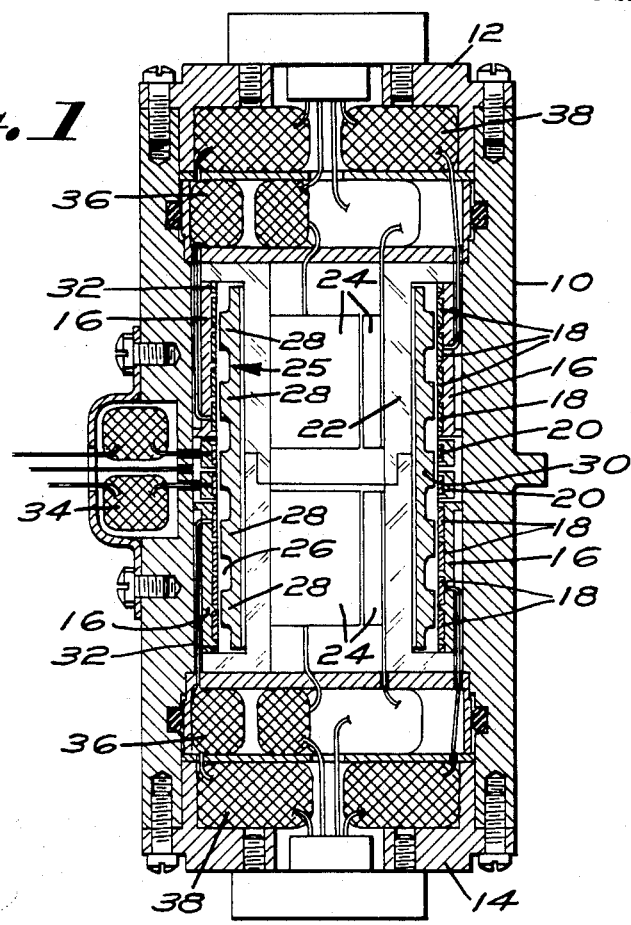
FIG. 1 is a sectional view through one form of accelerometer instrument of the present invention, wherein the proof mass, suspension, forcer and pick off components are all enclosed within a single casing.

Although it is recognized that for high precision results the basic proof mass or pendulosity of an accelerometer should be completely free of all suspension forces and torques, and that preferably only the acceleration detection mass should be suspended, previous efforts to attain these objectives have been disappointing and have fallen short of attainment of the degrees of precision and range required for example in connection with projected space travel programs. Whereas, for such purposes torque balance type instruments are inherently defective because of bearing drag forces and variations in effective lever arm and effective mass causing changes in calibration factors, translation type systems substantially avoid such difficulties. However, prior translational types have also involved bearing force uncertainties rendering such instruments still impracticable for the high precision duties referred to hereinabove.

The present invention contemplates in an accelerometer instrument a proof mass of novel design electrostatically suspended, in combination with a novel forcer system and a novel pick off system. Generally stated, the basic principle of suspending the proof mass utilizes the force between the charges on the plate of a capacitor. The attractive force tends to move the plates toward each other. With fixed voltages on the capacitor plates, the attractive force increases as the gap between the plates decreases. This is not wanted and therefore it is necessary to provide electrical means by which the voltage decreases rapidly with increasing capacitance and conversely, provides a rapidly increasing voltage for decreasing capacitance. The constrainment of the mass in two directions is obtained by an automatic voltage regulation which is an inherent characteristic of the resonance circuitry applied. This automatic voltage regulation changes the voltage across each capacitance in accordance with the gap between the cylindrical proof mass and the conductive segment. The resonance circuits are tuned so that the operating frequency is slightly above the resonance frequency. This means that with increasing capacitance the voltage across the conductive segment and the proof mass decreases, while an increasing gap between the sensor and the conductive segment produces a rise of the voltage level across the capacitance. The Q of the resonance circuits is chosen so that the voltage variations as a function of the changes in capacitance are rather large so that the electrostatic force reduces with decreasing distance between the proof mass and the conductive segment, and increases when this gap becomes larger. This results in a positive restoring force which constrains the proof mass in the center between the two opposite conductive segments. The pick off is basically a capacitance bridge with two variable condensers in opposite arms, to cause an unbalance in the output signal as the proof mass is displaced. The forcer system takes cognizance of the fact that the electrostatic force for parallel plates is dependent on the square of the voltage and is inversely proportional to the square of the distance. This dependency upon distance is overcome by using a co-axial forcer arrangement which makes the forcer sensitivity independent of the proof mass position. This technique also permits the use of a differential forcing relationship which makes a force dependent upon the first power of the applied voltage.

Figure 2:
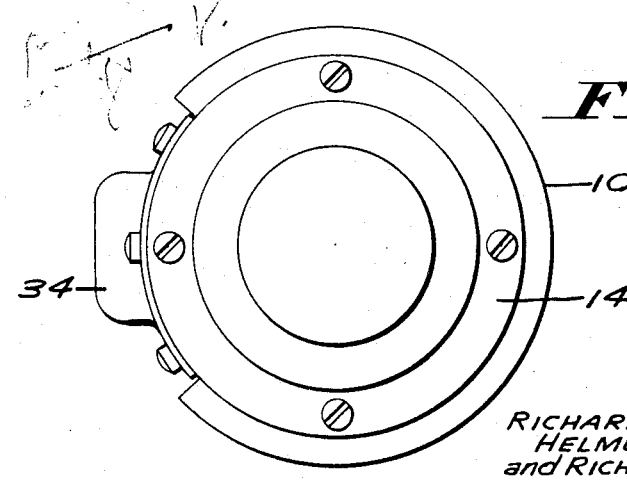
FIG. 2 is an end view of the instrument of FIG. 1.

Referring now to the drawings in FIGS. 1, 2, an accelerometer instrument of the present invention is illustrated to comprise a cylindrical casing 10 having end closure plates 12, 14 carrying inner mounting sleeves 16 which in turn mount eight forcer rings 18 arranged in two groups of four rings each on opposite sides of a pair of pick off rings 20, 20 which are located centrally of the device. A stationary inner hub portion 22 formed of dielectric material mounts interiorly thereof segment plates 24 arranged in two groups each comprising three 120° plates formed on the inner surface of the hub 22 as by a vapor deposition process, the plates thereby comprising a tuned electrostatic bearing thereby located to act on the inner diameter of the proof mass which is designated 25. The proof mass 25 comprises a thin walled cylinder formed of some non-magnetic material such as berrylium for example, so dimensioned as to "float" in an annular chamber 26 formed between the electrostatic bearing hub 22 and the forcer and pick off rings hereinabove described. As shown, the proof mass 25 is provided at its outer surface with four integrally formed radially extending ridges 28 and centrally thereof with a radially extending pick off ridge 30. Guard rings as indicated at 32 are provided at opposite ends at the ring centrally to minimize local stray in the electrostatic field.

Figure 3:
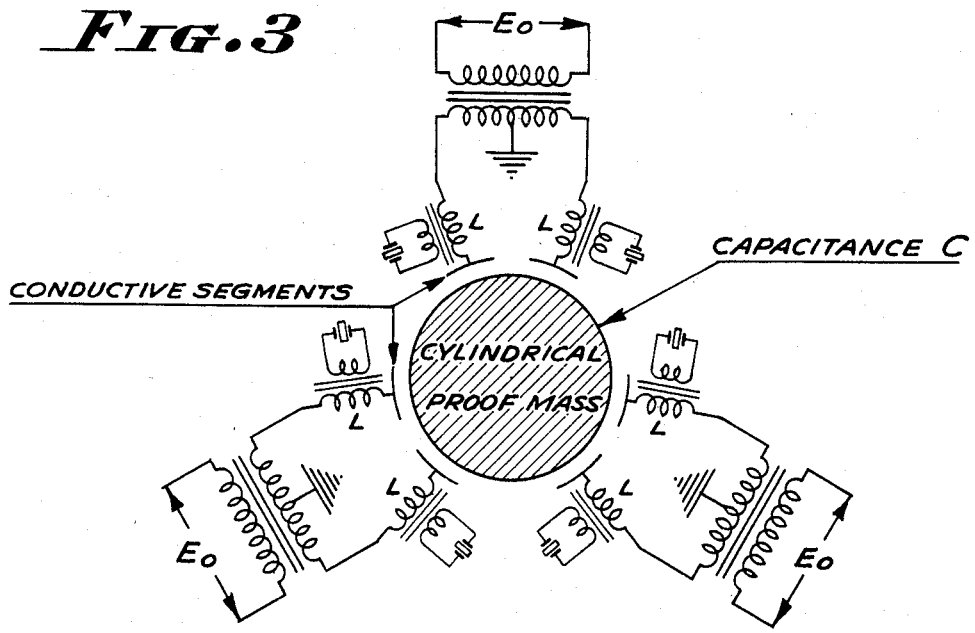
FIG. 3 is a fragmentary schematic and circuit diagram of the proof mass suspension system.
Figure 4:
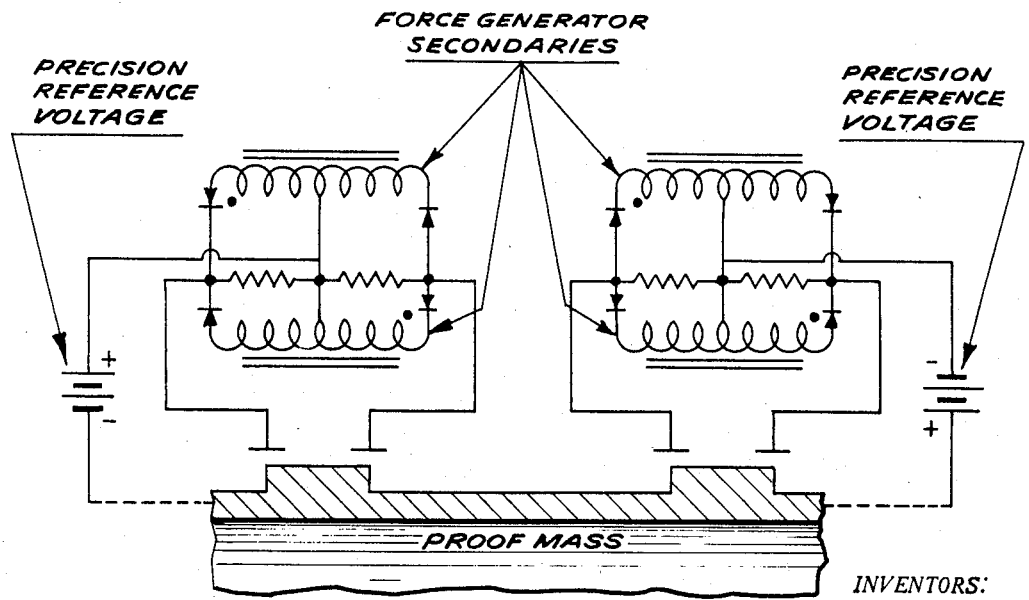
FIG. 4 is a mechanical and electrical schematic of the forcer system.

The pick off transformer is conveniently house as indicated at 34 within a portion of the casing 10, and the suspension inductors and force generating cores are conveniently housed within opposite ends of the casing as indicated at 36, 38 respectively. FIGS. 3, 4 illustrate schematically the circuit diagram for the electrostatic suspension system and the pulse forcer system respectively.

Thus it will be seen that the cylindrical proof mass 25 is electrostatically suspended by the system of condenser plates 24 which are mounted on the inner support cylinder 22. The proof mass is thus free to move over this inner cylinder 22 but is actively centered about this cylinder by the electrostatic forces produced by the suspension system. The plates 24 on the inner support cylinder are actually separated from the proof mass by a dielectric wall which provides automatic centering of the sensor in a 1 g. environment.

As stated, the outer surface of the cylindrical proof mass contains several upraised rings which are used in connection with the forcing and the pick off circuitry. The center ring is used as a capacitive pick off to give a signal directly proportional to the sensor position. This output signal is used to drive a voltage generator which applies voltage to the forcer rings to effectively constrain the proof mass. The electrostatic forcers are composed of a pair of rings acting upon one of the rings on the proof mass in such a way that the force is independent of the mass deflection and is directly proportional to the applied voltage from the force generator. The voltage is therefore readily integrated to give velocity, or the output may be used for transmission over a telemetering channel to provide remote analysis of the data.

The use of electrostatic phenomena throughout the design offers many advantages over other techniques. The proof mass is made of non-magnetic material and therefore no currents are produced which make the instrument sensitive to static magnetic fields. Since the accelerometer does not generate any heat within the proof mass nor the surrounding structure, a high degree of dimensional stability is achieved. There are no flex leads or wires required such as would cause large random variation in null forces. The design is basically simple, thus permitting high g. loadings during the boost phase of flight without damage to the instrument.

FIG. 3 illustrates how the potential of the cylinder may be kept near ground while providing the suspension torques. The cylindrical proof mass is constrained in two directions by electrostatic forces which result from the A.C. voltage across the capacitance formed by the cylinder and the conductive segments surounding it. This capacitance C is connected in series with the inductance L and supplied by the voltage $E_0$. The total electric circuitry constraining the mass in both directions therefore consists of three series resonance circuits, each containing a capacitance C, and an inductance L. This arrangement is repeated in three 120° specially phased coordinates and so constrains the accelerometer in two axes.

As shown in FIG. 3 the suspension system is preferably damped against vibration, by suitable means, for example by adding a crystal filter to each transformer circuit.

From the standpoint of possible error sources which may develop in the suspension system, it appears that the cylindrical configuration of the proof mass is the optimum shape. Because, the surface of the cylinder is an equipotential surface from an electrical standpoint, all force lines of the electrostatic field originating at the cylinder extend in a radial direction normal to its surface. This means, assuming a perfect cylindrical shape of the proof mass, that all forces go through the center of gravity so that no force from the suspension system can develop along the sensitive axis. This remains true for any shape of the conductive segments and any distance between the conductive segments and the surface of the cylinder that may occur during the operation.

The pick off system

The pick off is basically a capacitance bridge with two variable condensers in opposite arms to cause an unbalance in the output signal as the proof mass is displaced. A schematic representation of the circuitry is shown in FIG. 5.

The condensers $C_1$ and $C_2$ are formed from two fixed plates to the proof mass which is held at ground potentials by using the described bridge in two segments supplied by voltage 180° out of phase. The condensers C are fixed and are made equal to the variable condenser at a balanced output.

The output voltage $E_0$ is given by (1) $$E_0 = E_2 - E_1 = E_{br}\frac{C}{C+C_2} - \frac{C}{C+C_1}$$

where the bridge is balance $C_1 = C_2 = C$ and the output voltage is zero. The sensitivity of the bridge is given by (2) $$\frac{dE_0}{dx} = E_{br}\left(\frac{C}{C+C_2^2}\frac{dC_2}{dx} - \frac{C}{C+C_1^2}\frac{dC_1}{dx}\right)$$

if the pick off is symetrical $$\frac{dC_2}{dx} = \frac{-dC_1}{dx} = \frac{dC}{dx} \text{ and } C_1 \approx C_2 \approx C$$

as far as the terms in the denominator are concerned. Therefore (3) $$\frac{dE_0}{dx} = E_{br}\frac{\frac{dC}{dx}}{C}$$

The actual geometry of the pick off is shown in FIG. 6. The condensers C are formed from the shield A to the plate B and D. The condenser $C_1$ is from B to F and $C_2$ is from D to F. As the proof mass with the stub F is moved laterally, the condensers $C_1$ and $C_2$ change to cause the desired unbalance in the bridge. The size of the stub and the condenser plate B and D is determined by the spacing "d." These dimensions do not have to be so large as to eliminate end effects but merely large enough to minimize the secondary end effects from F to the outer edges of B or D. Based on preliminary design relationships, the axial dimensions need only be four times the gap. As a factor of safety, the actual dimensions have a ratio of nearly 10.

The capacity of the parallel moving plates per unit length is given by (4) $$C = .08842 K\frac{(X_0 + X)}{d} \mu\mu fd.$$

where $X_0$ is the effective length of the plates when the proof mass is centered. The rate of change of capacity is therefore (for the dielectric constant $K = 1$)

(5) $$\frac{dC}{dx} = .08842\frac{1}{d}\mu\mu fd./cm.$$

and the bridge sensitivity is (6) $$\frac{dE_{br}}{dx} = E_{br}\frac{1}{X_0} \text{ (volts/cm.)}$$

The forcer system

The electrostatic force for parallel plates is dependent upon the square of the voltage and inversely proportional to the square of the distance. A design based upon a nonlinear forcer which is sensitive to the displacement position of the sensor would impose stringent requirements upon the forcing loop in terms of stability and would require a very tight constrainment loop. The dependence upon distance is overcome by using a co-axial forcer arrangement which makes the forcer sensitivity independent of the proof mass position. This technique also permits the use of a differential forcing relationship which make a force dependent upon the first power of the applied voltage.

FIG. 7 indicates the general geometry of the forcer. The proof mass has a rib F which forms one plate of the condensers to the plates A and B; the respective condensers are designated $C_a$ and $C_b$. The spacing between the plates and rib is $d$. The capacitance between either A or B and the lower portions of the proof mass must be made small to obtain the highest sensitivity but does not effect the basic linearity of the system. As pointed out in connection with the pick off, which has a similar geometry, the major end effects do not effect the basic phenomena, it is only necessary to keep the secondary end effects between the rib and the outer edges of the plates A and B linear in the range of operation. Based upon a calculation of the effective length of the stray effect, this is accomplished to the desired accuracy by making the linear dimensions four times the gap spacing $d$. A practicable design would use a ratio of about ten.

The force on the proof mass due to voltage on one plate (either A or B) is given by the relationship (7) $$F_x = \frac{dU}{dx}$$

where $F_x$ is the force acting in the $x$ direction and $U$ the energy stored in the electrostatic field.
The energy is given by (8) $$U = \frac{1}{2}CE^2$$

E voltage across the condenser C.
If the voltage across the condenser is held constant (9) $$F = \frac{E^2}{2}\frac{dc}{dx}10^5 \text{ dynes}$$

(C in farads)

The basic force equation for parallel plates can be derived from the above quotation if the derivative with respect to "$d$" of Equation 3 is substituted for $dc/dx$. In the case of a practicable forcer the rate of change of capacitance would be the same as derived for the pick off (Eq. 5). The above relationships are derived for a unit length, the total force is given by

(10) $$F = 4.4 \cdot 10^{-7} \varphi \frac{E^2}{d} \text{ dynes}$$

where $\varphi$ is the circumference of the rib
so that $\varphi = 2\pi ro : ro$ outer radius of rib If the voltage $E_a$ is applied to plate A and $E_b$ is applied to plate B, the resultant force is proportional to $E_a^2 - E_b^2$. The forcer can be linearized by noting the relationship.

(11) $$E_a^2 - E_b^2 = (E_a + E_b)(E_a - E_b)$$

Therefore if the sum of the voltages can be held constant the force will be directly proportional to difference potential. FIG. 8 indicates the general method by which this can be accomplished. A reference precision power supply is connected to a push pull source of the forcer voltage to mechanize the mathematics of the last formula hereinabove. It should be noted that this general technique could be used both for A.C. or D.C. forcing provided the appropriate reference supply is used.

Figures 9, 10:
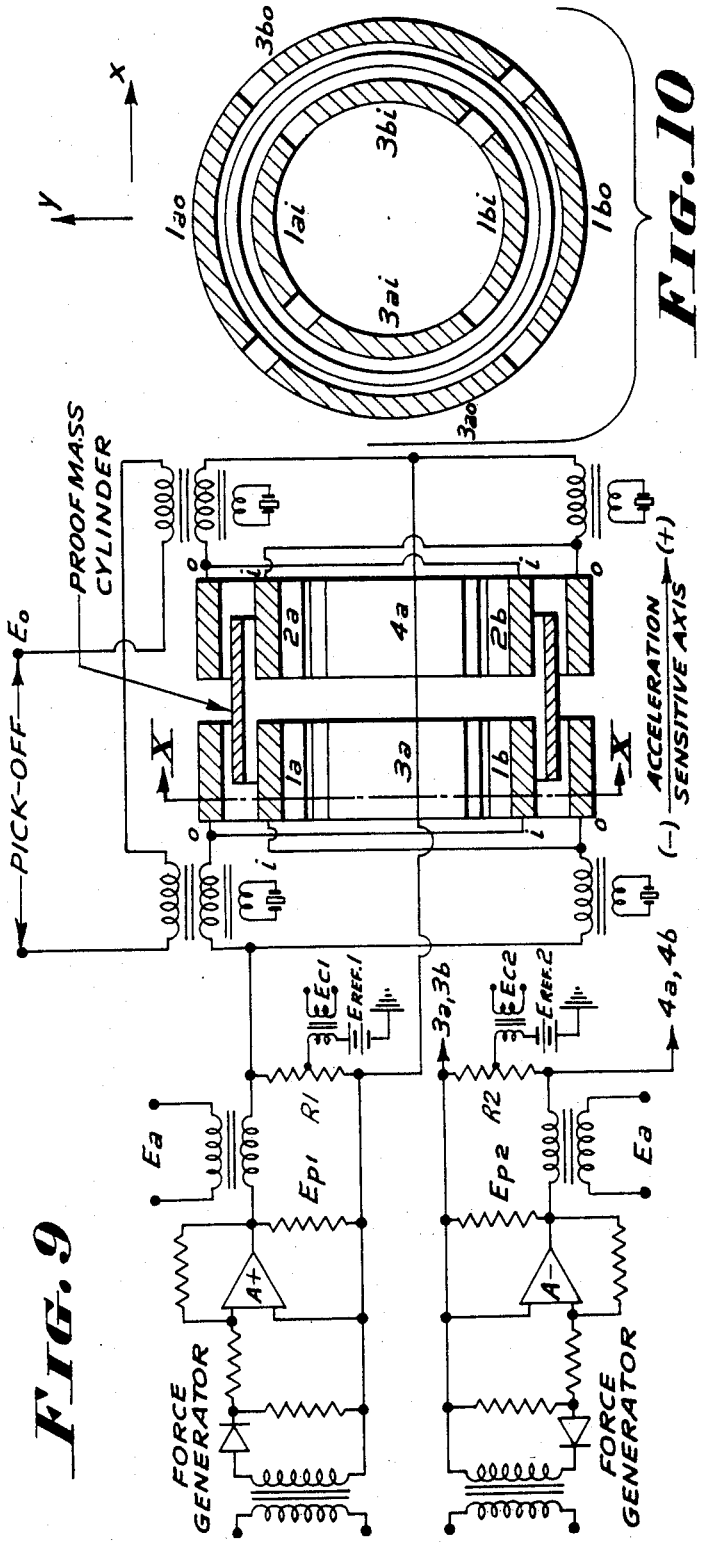
FIG. 9 is a schematic illustration, partly in section, of another form of the accelerometer of the invention.
FIG. 10 is a fragmentary section taken along lines X—X of FIG. 9.

FIGS. 9, 10 illustrate application of the electrostatic suspension, forcer and pick off techniques of the present invention to the construction of a high range accelerometer instrument. The novelty of this design resides in the technical approach to the solution of the various electrostatic problems in the case of a high acceleration range (up to 25 g.). The high voltages and the breakdown problems which become of primary importance for the suspension and forcing of a mass and high acceleration require a small size accelerometer proof mass. This appears obvious from the standpoint that the electrostatic forces are proportional to the surface S of the mass while its weight is a function of the proof mass volume V. Since the ratio of $S/V$ increases with a decreasing size of the proof mass it is highly desirable to design this mass as small as possible. Unfortunately, the mechanical tolerances (mainly the surface roughness) determine the dynamic range of the instrument insofar as the unwanted suspension force components $F_p$ parallel to the active electrostatic proof mass surface are related to the desirable normal suspension force $F_n$ by means of the surface roughness $\Delta x$. This relationship for a proof mass cylinder can be written:

(12) $$F = F_n \cdot 2\frac{2\Delta X^2}{\varphi \cdot d} \text{ where}$$

where
$\varphi$ = length of cylinder
$d$ = diameter of cylinder
$\Delta x$ = RMS value of surface roughness
$F_n$ = Force normal to cylinder wall
$P_p$ = Force parallel to cylinder wall This equation shows that the ratio $F_p/F_n$ which determines the random variations in the measurement of the accelerations depends on the surface roughness related to the size of the proof mass. As a result, a practical limit for the size of the proof mass develops which is determined by the achievable machining accuracy of the mechanical structure of the electrostatic arrangement. Therefore, it bocomes apparent that for the design of an electrostaic accelerometer for high acceleration a small and extremely simple proof mass has to be chosen. Otherwise the requirement of a minimum $$\frac{\Delta x^2}{\varphi d}$$

cannot be realized.

This invention, therefore, contemplates ways and means to combine in novel manner known electrostatic suspension phenomena, forcing and pick off arrangements, so that an instrument with an extremely small and simple, proof mass configuration can be devised, and whereby a large dynamic operating range can thereby be achieved.

FIG. 9 is a schematic illustration of an accelerometer embodying the invention, with some of the associated electronics. FIG. 10 shows a cross sectional view of the device of FIG. 9 in the direction of the sensitive axis, and indicates the radial arrangement of forcer and suspension plates as well as the proof mass cylinder. The circuitry at the left hand side of FIG. 9 shows a portion of the suspension and forcer electronics which operates to constrain the proof mass in the direction of acceleration, and produces the output.

The proof mass in this high range form of accelerometer comprises a simple, small size cylinder which is machined to the utmost accuracy. This cylinder is suspended in two radial directions by electrostatic forces developing from the configuration of a series of suspension plates. As shown, these suspension plates are arranged in four rings, two of them inside the proof mass cylinder, and two of them on the cylinder outside. Each ring contains four segments, and each segment covers an angle of a little less than 90 deg. In each of the two orthogonal coordinates, $x$ and $y$ (FIG. 10) there are 8 stationary suspension segments, four on both sides of each end of the proof mass cylinder. The plates arranged in the $x$ direction are labeled by 3 and 4, and carry the designation $a$ and $b$ depending on whether they are on the left hand side or on the right hand side of the instrument. The further subscript $o$ indicates that the plate is on the outside of the proof cylinder while the subscript $i$ indicates its position on the cylinder inside. A corresponding designation applies to the $y$ coordinate where the plate arrangements 1 and 2 with the subscripts $a$ and $b$, and the further subscripts $o$ and $i$ are shown.

The proof mass is suspended by 200 kc. A.C. voltages $E_a$ which are supplied to the various L/C resonance arrangements shown in FIG. 9. The suspension plates are connected so that a radial motion of the proof mass cylinder causes development of restoring forces which operate to center this cylinder. As the suspension plate arrangements on opposite ends of the cylinder are supplied by A.C. voltages of opposite phase, the A.C. potential of the proof mass stays on 0. This suspension system is repeated in each of the $x$ and $y$ coordinates.

Superimposed on these suspension voltages are the forcer voltages. These voltages are amplified by the amplifiers $A^+$ and $A^-$ and appear as $E_{p1}$ and $E_{p2}$ at their outputs. The total suspension and forcer voltages appear then across the resistance $R_1$ and $R_2$. The forcer system is biased by the reference voltages $E_{ref}1$ and $E_{ref}2$, which are connected in opposite polarity between ground and the center point of the resistances $R_1$ and $R_2$. By means of these bias voltages all plate configurations in the $x$ axis obtain a negative voltage. Therefore, the D.C. potential of the proof mass cylinder again remains on 0. If a voltage develops from the positive generator, it goes to all plate configurations in the $y$ axis. Therefore, it adds to $E_{ref}.1$ at all segments on the left hand side of the proof mass cylinder. These are $1a_o$, $1a_1$ and $1b_o$, $1b_1$. However, it subtracts from $E_{ref}1$ on the plate segments $2a_1$, $2a_1$ and $2b_1$, $2b_1$. This produces a force on the cylinder towards the left hand side and so balances an acceleration in this direction. If the acceleration develops in the opposite direction, the generator ($-$) has to produce a voltage which develops a corresponding voltage across R and decreases the negative bias voltage across the plate segments $3a_o$, $3a_1$, $3b_o$, $3b_1$ while it increases the bias voltage at $4a_o$, $4a_1$, $4b_o$, $4b_1$. This produces a pull on the proof mass cylinder towards the right and so compensates for this acceleration effect.

The split of the suspension system into the two ring arrangements, 1, 3 and 2, 4 on both ends of the proof cylinder is required to prevent any tilting of the proof mass cylinder axis off the measuring axis of the instrument. The two independent suspension systems regulate such that each end of the proof mass cylinder is always properly balanced and centered. However, if the proof mass moves in the direction of the measuring axis, the suspension plate voltages on each end of the proof mass cylinder change. This causes an additional restoring force resulting from the suspension system which is not desirable. It also creates an indication for the motion of the proof mass cylinder in its axial direction. This indication is used for pick off purposes to control the operation of the forcer. Therefore, the pick off voltage $E_o$ is developed from the addition of the two inductive voltages created by the A.C. suspension current to the plates $1a_o$ and $2a_o$ (see FIG. 9). Since these voltages are rather high, the pick off is extremely sensitive so that practically no amplification of the pick off voltage $E_o$ is required.

In order to compensate for the axial force that develops from small differences in the segment voltages, the compensating A.C. voltages $E_{c1}$ and $E_{c2}$ are introduced into the system. These voltage components are added in series with the reference voltages $E_{ref}.1$ and $E_{ref}.2$ and chosen proportional to the pick off voltage $E_o$. It can be shown that it becomes possible to compensate with these voltages the restoring force effects of the suspension system and so make the measurement of the acceleration independent of the suspension system.

We claim:

1. An acceleration responsive device comprising in combination relatively telescoped stationary and translational cylindrically shaped members, means relatively suspending said members electrostatically, said electrostatic suspension means including an electronic circuit embodying forcer means biasing the translational member, the circuitry of said suspension means including means arranged to damp vibrations of said translational member, and electronic pick off means associated with said members and operable to deliver signal outputs proportional to displacements of said translational member relative to said stationary member.

2. An acceleration responsive device comprising in combination stationary cylindrical member and a circumscribing cylindrical shaped proof mass, means operable through said stationary member and against the inner surface of said proof mass to electrostatically suspend said proof mass in spaced movable relation thereon, said electrostatic suspension means including an electronic circuit embodying forcer means biasing said proof mass, the circuitry of said suspension means including means arranged to damp vibrations of said proof mass, and electronic pick off means operable to deliver signal outputs proportional to displacements of said proof mass relative to said stationary member.

3. An acceleration responsive device comprising in combination a stationary cylindrical member and a circumscribing cylindrical shaped proof mass, means operable through said stationary member and against the inner surface of said proof mass to electrostatically suspend said proof mass in spaced movable relation thereon, said electrostatic suspension means including an electronic circuit embodying forcer means biasing said proof mass, and electronic pick off means operable to deliver signal outputs proportional to displacements of said proof mass relative to said stationary member.

4. An acceleration responsive device comprising in combination relatively telescoped stationary and translational cylindrically shaped members, means relatively suspending said members electrostatically, said electrostatic suspension means including an electronic circuit embodying forcer means biasing the movable member, and electronic pick off means associated with said members and operable to deliver signal outputs proportional to displacements of said movable member relative to said stationary member.

5. An acceleration-responsive device comprising a relatively fixed member and an acceleration-responsive member movable with respect thereto, means on said fixed member for electrostatically locating said movable member relative thereto while permitting freedom of movement thereof in an acceleration-sensitive direction, forcer means for exerting an electrostatic restoring force to said movable member in said acceleration-sensitive direction independent of the position of said movable member, and pick-off means responsive to the position of said movable member in said acceleration-sensitive direction to vary the effect of said forcer means.

6. An acceleration-responsive device comprising an inner cylindrical member, an intermediate cylindrical member and an outer cylindrical member, all disposed in generally concentric, radially spaced relationship, said inner and outer members being relatively fixed and said intermediate member being movable for sensitivity to acceleration, said inner and outer members presenting, with said intermediate member, concentric capacitor surfaces, suspension circuit means including at least some of said surfaces as elements thereof for electrostatically locating said intermediate member in radially spaced relation with respect to said inner and outer members, forcer circuit means connected to at least some of said surfaces for applying axial electrostatic force on said intermediate member independent of its position relative to said inner and outer members, and pick-off circuit means connected to at least some of said surfaces and to said forcer circuit means for varying the effect of the latter in response to position of said intermediate member relative to said inner and outer members.

7. The device as defined in claim 6 wherein said surfaces are common to all of said circuit means.

8. The device as defined in claim 7 wherein said surfaces of the inner and outer members are symmetrically segmentized whereby said intermediate member may be maintained at zero potential by applying out-of-phase electrostatic field-producing voltages to individual surface segments.

9. The device as defined in claim 6 wherein those surfaces included in said suspension circuit means, exclusive of those formed by said intermediate member, are symmetrically segmentized whereby the intermediate member may be maintained at zero potential by applying outof-phase electrostatic field-producing voltages to individual surface segments.

10. An acceleration-responsive device comprising in combination relatively telescoped stationary and translational cylindrically shaped members, said members being radially spaced to present concentric capacitor plate surfaces and said translational member having a normal position in which at least certain of said surfaces are in staggered, overlapping relation, means carried by said stationary member to electrostatically suspend said translational member relative thereto, said means including resonant circuits including pairs of said surfaces as elements thereof, in which said circuits are tuned to a frequency slightly below the operating frequency of the circuits tending to maintain said translational member concentric to said stationary member, said certain surfaces including at least two pairs of such surfaces so disposed that upon axial movement of said translational member, the surfaces of one pair increase in overlap while the surfaces of the other pair decrease in overlap, said means including forcer means for imposing upon the stationary member-surfaces of said pair of surfaces separate voltages whereby to impart an axial restoring force on said translational member independent of its position relative to the stationary member, and pick-off means for detecting positional changes of said translational member and connected to said forcer means to vary the restoring force thereof.

References Cited by the Examiner
UNITED STATES PATENTS

| | | | |
|---|---|---|---|
| 2,316,915 | 4/1943 | Truman | 264—1 |
| 2,591,921 | 4/1952 | Cosgriff et al. | 264—1 |
| 2,840,366 | 6/1958 | Wing | 264—1 |
| 2,856,240 | 10/1958 | Breazeale et al. | 264—1 |
| 2,919,583 | 1/1960 | Parker | 73—517 X |
| 2,942,479 | 6/1960 | Hollmann | 73—517 X |
| 2,966,802 | 1/1961 | Steen | 73—516 |

RICHARD C. QUEISSER, *Primary Examiner.*

SAMUEL LEVINE, BENJAMIN A. BORCHELT,
*Examiners.*

J. J. GILL, *Assistant Examiner.*